United States Patent
Hakanson

(10) Patent No.: US 9,338,598 B2
(45) Date of Patent: May 10, 2016

(54) GEO-FENCE SOLVER

(71) Applicant: Samsung Electronics Co., Ltd., Gyeonggi-do (KR)

(72) Inventor: Robin Hakanson, Cedar Rapids, IA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/536,090

(22) Filed: Nov. 7, 2014

(65) Prior Publication Data
US 2016/0014559 A1    Jan. 14, 2016

Related U.S. Application Data

(60) Provisional application No. 62/022,473, filed on Jul. 9, 2014.

(51) Int. Cl.
| | | |
|---|---|---|
| *H04W 72/00* | (2009.01) | |
| *H04W 4/02* | (2009.01) | |
| *H04B 1/3816* | (2015.01) | |

(52) U.S. Cl.
CPC ............. *H04W 4/021* (2013.01); *H04B 1/3816* (2013.01)

(58) Field of Classification Search
CPC ... G06F 1/3203; G06F 1/3287; G06F 1/3206; G06F 1/3209; G06F 1/3296; H04W 4/021; H04W 52/0296
USPC ........................................................ 455/450
See application file for complete search history.

(56) References Cited

U.S. PATENT DOCUMENTS

| | | |
|---|---|---|
| 7,633,389 B2 | 12/2009 | Mantovani et al. |
| 8,229,473 B1 | 7/2012 | De La Rue |
| 8,350,696 B2 | 1/2013 | McClellan et al. |
| 8,396,485 B2 | 3/2013 | Grainger et al. |
| 8,504,061 B2 | 8/2013 | Grainger et al. |
| 2008/0162034 A1 | 7/2008 | Breen et al. |
| 2010/0127919 A1* | 5/2010 | Curran .................. G01S 19/40 340/573.4 |
| 2010/0253508 A1 | 10/2010 | Koen et al. |
| 2011/0151839 A1 | 6/2011 | Bolon et al. |
| 2012/0309413 A1 | 12/2012 | Grosman et al. |
| 2012/0329420 A1 | 12/2012 | Zotti et al. |
| 2013/0072226 A1* | 3/2013 | Thramann ............ H04W 4/028 455/456.1 |
| 2013/0093627 A1 | 4/2013 | Cosman |
| 2013/0138334 A1 | 5/2013 | Meredith et al. |
| 2013/0141275 A1 | 6/2013 | Abraham |
| 2013/0178233 A1 | 7/2013 | McCoy et al. |
| 2014/0088864 A1* | 3/2014 | Lamarca ................ G01C 21/34 701/465 |
| 2014/0179279 A1* | 6/2014 | Skeba ..................... H04W 4/16 455/414.1 |
| 2014/0273955 A1* | 9/2014 | Oesterling .......... H04L 63/0853 455/411 |

* cited by examiner

*Primary Examiner* — Don N Vo
(74) *Attorney, Agent, or Firm* — The Farrell Law Firm, P.C.

(57) ABSTRACT

A computer-implemented method performed by a UE is provided. The computer-implemented method includes generating, with a first chipset, a first set of geo-fence rules; generating, with the first chipset, a second set of geo-fence rules, which are a simplified subset of the first set of geo-fence rules; transmitting the second set of geo-fence rules to a second chipset; powering down the first chipset; detecting if at least one of the second set of geo-fence rules has been broken; and if at least one of the second set of geo-fence rules is broken, powering up the first chipset to determine if the at least one broken second rule is indicative of breaking at least one rule of the first set of geo-fence rules.

20 Claims, 7 Drawing Sheets

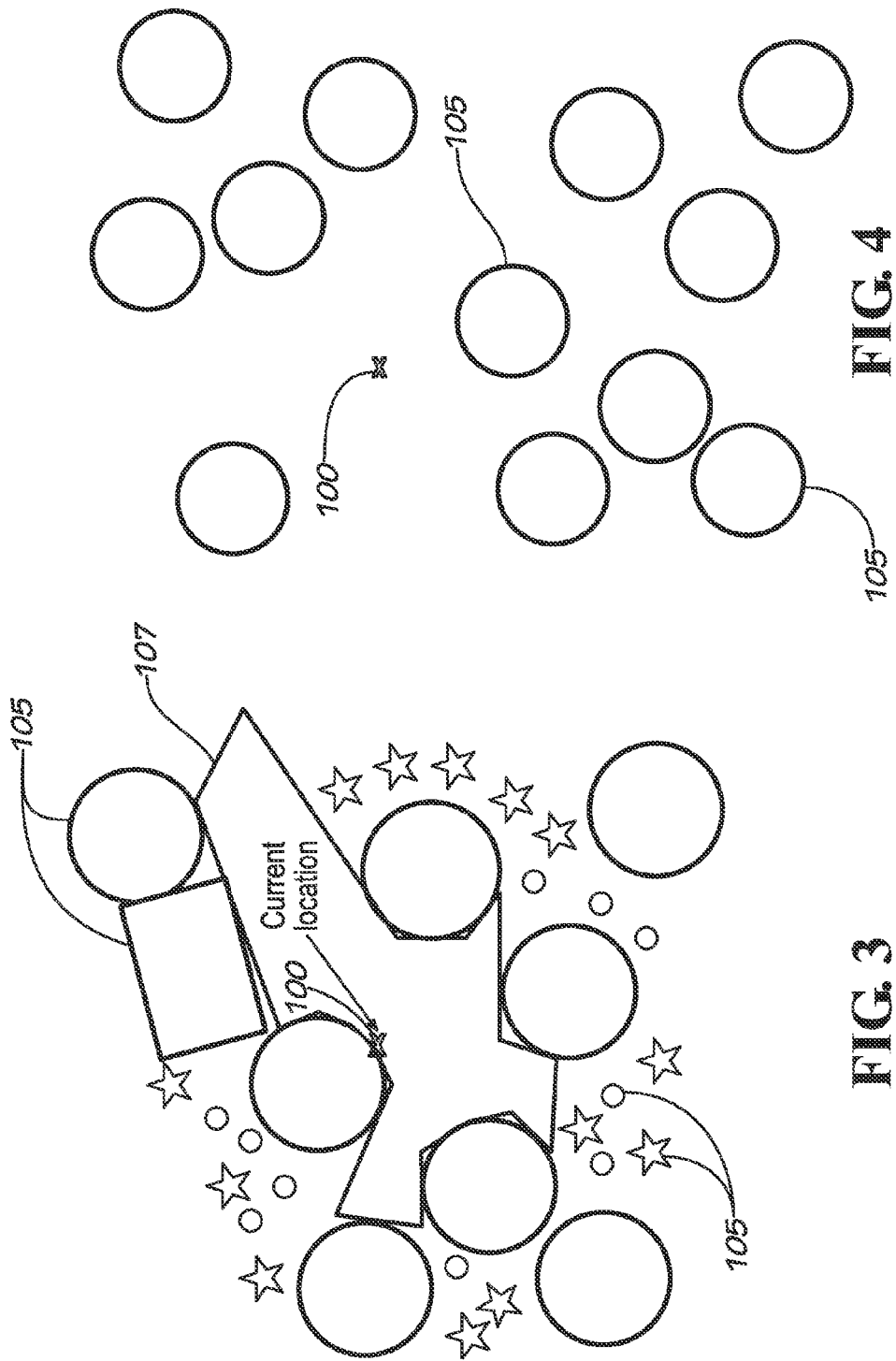

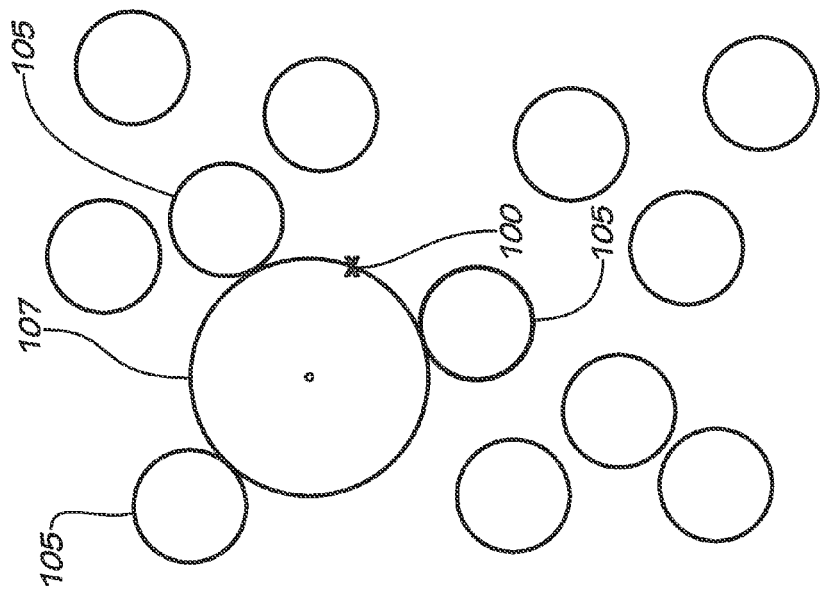
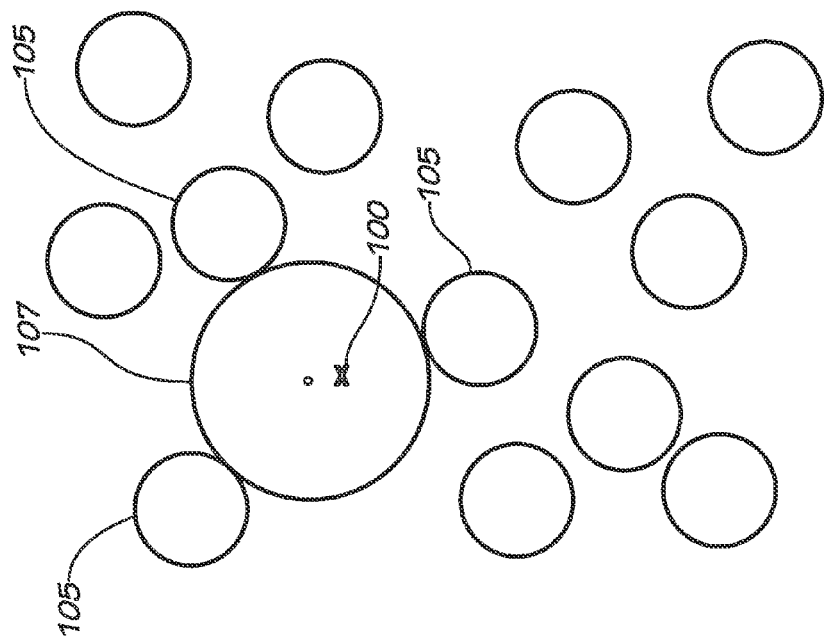

GEO-FENCE SOLVER

PRIORITY

This application claims priority under 35 U.S.C. §119(e) to U.S. Provisional Patent Application Ser. No. 62/022,473, which was filed in the U.S. Patent and Trademark Office on Jul. 9, 2014, the entire disclosure of which is incorporated herein by reference.

BACKGROUND OF THE INVENTION

1. Field of the Invention

The present invention relates generally to location tracking, and more particularly to apparatuses and methods for specifying and activating a location perimeter (referred to as a geo-fence) using a power efficient geo-fence solver.

2. Description of the Related Art

There is a location service generally provided by application programming interfaces (API) on smart phones, and other location enabled devices, called geo-fencing. A geo-fence is a virtual perimeter imposed on a geographic area, where the user (e.g., application on a user equipment (UE)) describes areas of interests, either to get notification on entering/leaving or precise navigation in certain areas. For example, a dynamic geo-fence may be continuously defined around the UE so that the UE may retrieve points of interest (POI) geographically located within a dynamic geo-fence and provide those POI to the UE. However, continuous movement of the UE, such as might occur in a vehicle, may result in repeated geo-fence redefinition (i.e., the UE crosses over the geo-fence perimeter) and POI retrieval, both which may drain the UE's power source.

Therefore, there exists a need for apparatuses and methods for specifying and activating a geo-fence using a power efficient geo-fence solver.

SUMMARY OF THE INVENTION

The present invention has been made to address the above problems and disadvantages, and to provide at least the advantages described below. Accordingly, an aspect of the present invention, which may prove useful in the related arts, is to provide apparatuses and methods for specifying and activating a geo-fence using a power efficient geo-fence solver.

Another aspect of the preset invention provides a geo-fence solver that is programmed for a relatively unlimited amount of simultaneous user request in a power efficient manner using a minimum amount of costly resources (e.g., location chip hardware).

In accordance with an aspect of the present invention, a computer-implemented method performed by a UE is provided. The computer-implemented method includes generating, with a first chipset, a first set of geo-fence rules and a second set of geo-fence rules, which are a simplified subset of the first set of geo-fence rules; transmitting the second set of geo-fence rules to a second chipset; powering down the first chipset; detecting if at least one of the second set of geo-fence rules has been broken; and if at least one of the second set of geo-fence rules is broken, powering up the first chipset to determine if the at least one broken second rule is indicative of breaking at least one rule of the first set of geo-fence rules.

In accordance with another aspect of the present invention, a UE is provided. The UE includes at least two chipsets; and memory coupled to the at least two chipsets and configured to store instructions, which, when executed by the at least two chipsets, causes the at least two chipsets to perform operations including: generating, with a first chipset, a first set of geo-fence rules and generating, with the first chipset, a second set of geo-fence rules, which are a simplified subset of the first set of geo-fence rules; transmitting the second set of geo-fence rules to a second chipset; powering down the first chipset; detecting if at least one of the second set of geo-fence rules has been broken; and if at least one of the second set of geo-fence rules is broken, powering up the first chipset to determine if the at least one broken second rule is indicative of breaking at least one rule of the first set of geo-fence rules.

In accordance with another aspect of the present invention, a UE is provided. The UE includes at least two chipsets; and memory coupled to the at least two chipsets and configured to store instructions, which, when executed by the at least two chipsets, causes the at least two chipsets to perform operations including: generating, with a first chipset, a first geo-fence area of the UE; powering down the first chipset; determining, by a second chipset programmed with navigational capabilities, if the UE moves outside of the first geo-fence area; if the UE is outside of the first geo-fence area, powering up the first chipset to determine if the UE has moved within another geo-fence area; if it is determined that the UE has not moved within another geo-fence area, generating, with the first chipset, a second geo-fence area and transmitting the second geo-fence area to the second chipset; and if it is determined that the UE has moved within another geo-fence area, switching the second chipset to a continuous update mode, and monitoring, with the first chipset, the another geo-fence area to the determine if the UE moves outside of the another geo-fence area, and upon the UE moving outside of the another geo-fence area, generating the second geo-fence area and transmitting the second geo-fence area to the second chipset.

In accordance with another aspect of the present invention, a UE is provided. The UE includes at least two chipsets; and memory coupled to the at least two chipsets and configured to store instructions, which, when executed by the at least two chipsets, causes the at least two chipsets to perform operations including: generating, with a first chipset, a first geo-fence area of the UE and a time duration for which it would take the UE to move outside of the first geo-fence area; powering down the first chipset for the time duration; transmitting the time duration to a second chipset; if, upon expiration of the time duration, it is determined that the UE has not moved within another geo-fence area, generating, with the first chipset, a second geo-fence area and a second time duration for which it would take the UE to move outside of the second geo-fence area, and transmitting the second time duration to the second chipset; and if, upon expiration of the time duration, it is determined that the UE has moved within another geo-fence area, switching the second chipset to a continuous update mode, and monitoring, with the first chipset, the another geo-fence area to the determine if the UE moves outside of the another geo-fence area, and upon the UE moving outside of the another geo-fence area, generating the second geo-fence area and the second time duration, and transmitting the second time duration to the second chipset.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 3 is a diagram illustrating the UE within a geo-fence region that is based on a simplified set of geo-fence rules, according to another embodiment of the present invention;

FIGS. 4-9 are diagrams illustrating a computer implemented method performed by the UE shown in FIG. 1, according to an embodiment of the present invention;

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist in the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As noted above, apparatuses and methods for specifying and activating a geo-fence using a power efficient geo-fence solver may prove useful in the related arts, and such a geo-fence solver is herein described.

In accordance with the embodiments of the present invention, two chipsets are provided in a UE and are programmed for determining when the UE moves into and out of geo-fence areas. The UE can be embodied in various forms including, but not limited to, personal computers, laptop computers, personal digital assistants (PDAs), mobile/cellular phones, smart phones, etc. For illustrative purposes, it is assumed that the UE is a smart phone.

Figure 1:
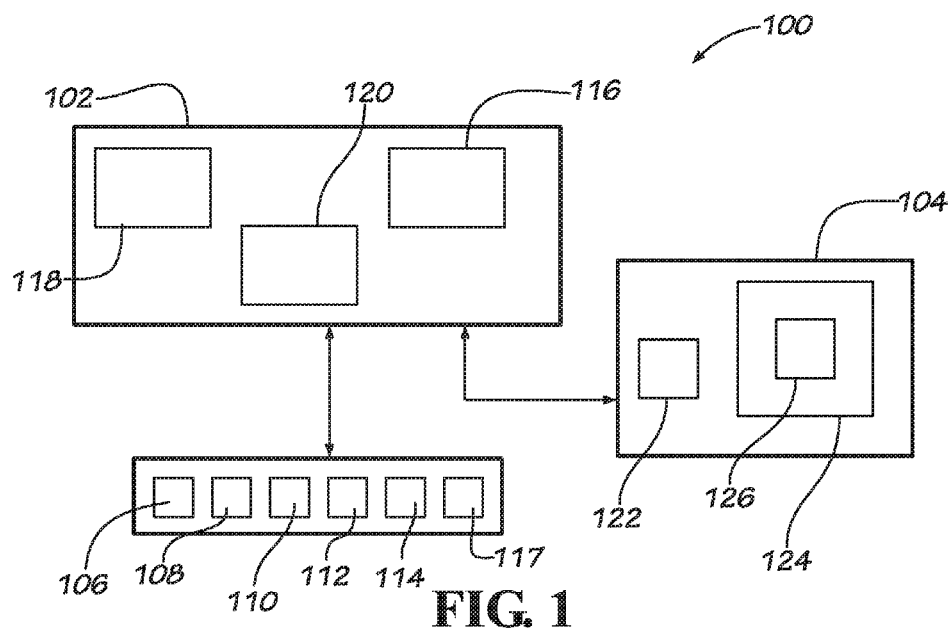
FIG. 1 is a block diagram of a UE, according to an embodiment of the present invention.

FIG. 1 is a block diagram of a UE 100, according to an embodiment of the present invention. The UE 100 operates similar to conventional UEs and is configured for receiving/sending phone calls and texts, for accessing one or more internet service providers for viewing and downloading data, and other functions that are typically performed by conventional smart phones. The UE 100 is configured to perform these various functions through connection to a network (not shown).

The pertinent components of the UE 100 include a first chipset 102 and a second chip set 104. For illustrative purposes, the second chipset 104 is shown as a separate component from the first chip set 102. However, the second chipset 104 may be embedded on the first chipset 102, e.g., to provide a tracker global navigation satellite system (GNSS) solution, which would provide a power efficient geo-fencing device on a tracker solution; conventional tracker solutions are typically deemed not to be suitable for power efficient geo-fence operations due to their lack of location knowledge.

The UE 100 may also include one or more transmitters 106, receivers 108, antennas 110, speakers 112, displays 114, memory 116, and other peripherals (e.g., drivers 117). The first chipset 102 (and/or the second chipset 104) communicates with these devices to perform one or more functions of the UE 100.

Figure 2:
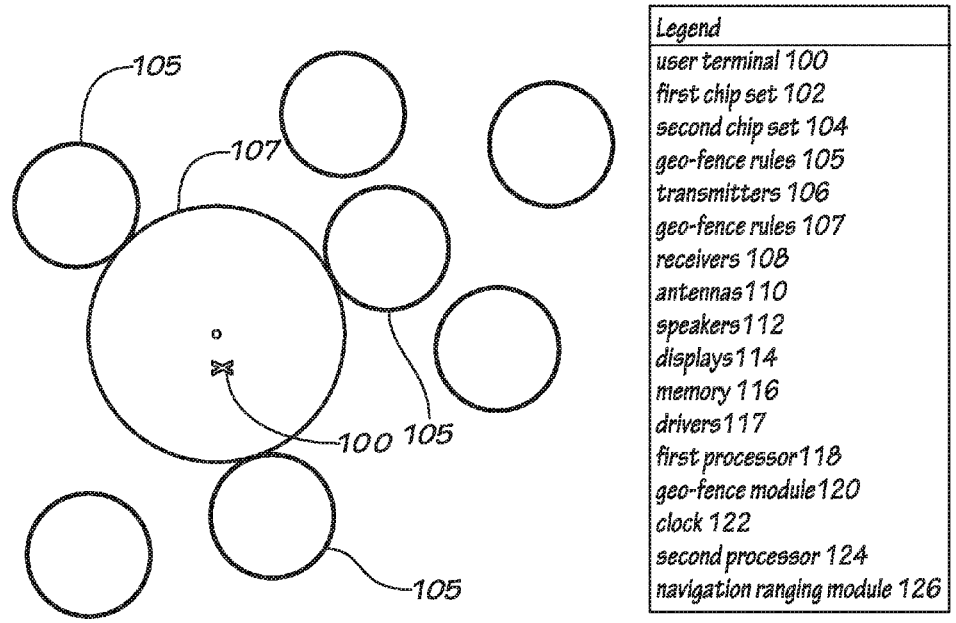
FIG. 2 is a diagram illustrating the UE within a geo-fence region that is based on a simplified set of geo-fence rules, according to an embodiment of the present invention.

The first chip set 102 is a high-power chipset that provides logic calculations and data-storage (e.g., to the memory 116) and includes at least one first processor 118 for controlling one or more of the devices 106-117 and at least one geo-fence module 120 for generating a first set of geo-fence rules 105 and a second set of geo-fence rules 107 (FIG. 2).

The geo-fence module 120 of the first chipset 102 is programmed to process all the data relating to the first set of geo-fence rules 105 (e.g., the full set of geo-fence rules). As the first set of geo-fence rules 105 require a great deal of memory and power to solve, the geo-fence module 120 of the first chipset 102 is also programmed to generate the second set of geo-fence rules 107, which are a simplified subset of the first set of geo-fence rules 105.

In accordance with the embodiments of the present invention, if it is determined that the at least one of the second set of geo-fence rules is broken, then this may be indicative that one of the first set of geo-fence rules 105 is broken. More importantly, however, if none of the second set of geo-fence rules 107 is broken, then this is indicative that none of the first set of geo-fence rules 105 is broken; the significance of which is described in greater detail below.

Once the geo-fence module 120 of the first chipset 102 generates the second set of geo-fence rules 107, the first processor 118 transmits these rules to the second chipset 104, which operates in a power memory resource efficient manner while monitoring the second set of geo-fence rules 107. After the geo-fence module 120 transmits the second set of geo-fence rules 107 to the second chipset 104, the geo-fence module 120 transmits a power down command or sleep mode command to the first processor 118 of the first chipset 102, which is then powered down.

The second chipset 104 has strict memory and processing constraints thereby allowing the second chipset 104 to operate at a much lower power level as compared to the first chipset 102. The second chipset 104 includes at least one clock 122 (e.g., a low power, low accuracy 18 kHz clock) and at least one second processor 124 (e.g., a location processor) including at least one navigation ranging module 126.

In embodiments of the present invention, it may prove advantageous for the second chipset 104 to be programmed to access location information, e.g., GNSS information, microelectromechanical systems (MEMS) Sensor information, WiFi connection information, cellular information, etc.

The second processor 124 receives the second set of geo-fence rules 107 from the geo-fence module 122 and determines if at least one of the second set of geo-fence rules 107 has been broken. When the second processor 124 of the second chipset 104 determines that at least one of the second set of geo-fence rules 107 is broken, the second processor 124 notifies the geo-fence module 120 of the first chipset 102 so that the geo-fence module 120 can determine if any of the first set of geo-fence rules has been broken 105.

If the geo-fence module 120 determines that none of the first geo-fence rules 105 have been broken, the geo-fence module 120 generates another second set of geo-fence rules, which may be the same as or different from the original second set of geo-fence rules 107. On the other hand, if it is determined that at least one of the first geo-fence rules 105 is broken, the geo-fence module 120 transmits a power up command or wake command to the first processor 118 of the first chipset 102, which is then powered up. After the first chipset 102 is powered up, the second chipset 104 is set to a continuous update mode, and the first processor 118 of the first chipset 104 monitors a geo-fence area to the determine if the UE 100 moves outside of the geo-fence area, and upon the UE 100 moving outside of the geo-fence area, the geo-fence module 120 generates another second set of geo-fence rules.

FIG. 2 is a diagram illustrating the UE 100 shown in FIG. 1 within a geo-fence area that is based on the second set of geo-fence rules, e.g., a simplified set of geo-fence rules, according to an embodiment of the present invention. As shown in FIG. 2, the small circles represent first sets of geo-fence rules 105 needed to be monitored within a network, and the large circle represents the second set of geo-fence rules 107 generated by the geo-fence module 120 of the first chipset 102 and transmitted to the second processor 124 of the second chipset 104, which, as described above, is configured to determine if any of the rules of the second set of rules 107 have been broken.

While the first set of geo-fence rules 105 are shown as circles, this is merely for illustrative purposes. Generally, however, the first sets of geo-fence rules 105 are not this small and do not operate on circles.

For example, FIG. 3 is a diagram illustrating the UE 100 shown in FIG. 1 within a geo-fence region that is based on a simplified set of geo-fence rules, according to another embodiment of the present invention. As shown in FIG. 3, at least one of the first sets of geo-fence rules 105 and the second set of geo-fence rules 107 are embodied in a polygon configuration, e.g., rectangular configuration, star configuration, random configuration.

FIGS. 4-9 are diagrams illustrating a computer implemented method performed by the UE 100 shown in FIG. 1, according to an embodiment of the present invention.

In FIG. 4, the small circles represent a plurality of geo-fence areas each including a corresponding set of active geo-fence rules, e.g., the first set of geo-fence rules 105. When the first chipset 102 of the UE 100 is required to execute geo-fence operations, for example, as requested by a set of smartphone apps of the UE 100, the first processor 118 of the first chipset 102 sends the first sets of geo-fence rules 105 to the geo-fence module 120, which monitors all of the active first sets of geo-fence rules 105 (e.g., not uncommon to be greater than 1000).

Instead of transmitting all of the active first sets of geo-fence rules 105 to the second chipset 104, the geo-fence module 120 generates the second set of geo-fence rules 107, which, as described above, if broken may be indicative that at least one of the active geo-fence rules 105 has been broken.

Referring to FIG. 5, the second set of geo-fence rules 107 are represented by the large circle and are transmitted to the second processor 124 of the second chipset 104. The second set of geo-fence rules 107 do not represent a particular geo-fence area, but rather an area of interest that when crossed by the UE 100, alerts the second processor 124 to notify the geo-fence module 120 of the first chipset 102 to determine whether at least one of the first geo-fence rules 105 has been broken.

After the geo-fence module 120 of the first chipset 102 transmits the second set of geo-fence rules to the second processor 124, the geo-fence module 120 powers down (e.g., is placed in sleep mode). In accordance with embodiments of the present invention, it may prove advantageous to power down the entire first chipset 102, e.g., when the first chipset 102 is not performing other functions for the UE 100.

Moreover, if signal conditions are adequate, after receiving the second set of geo-fence rules 107, the second processor 124 of the second chipset 104 can also power down one or more clocks of the second chipset 104, while the clock 122, which, as noted above, is a low power, low accuracy clock, remains operable to track the furthest possible movement of the UE 100. One such clock may, for example, be a high power clock (not explicitly shown), which may be shared with other components of the UE 100. Thus, when signal conditions are adequate, the second processor 124 of the second chipset 104 may power off (or allow to power off) the high power clock, such as when the radio of the UE 100 is not needed. As can be appreciated, performing such operations may further decrease overall power consumption of the UE 100. In certain instances, however, e.g., when the radio of the UE 100 needs to be power cycled quickly to receive RF data phase coherent with the last time the radio was on, it may prove advantageous to keep the high power clock on.

Referring to FIG. 6, if the UE 100 moves outside of the second set of geo-fence rules 107, i.e., outside the area of interest, that was transmitted to the second processor 124 of the second chipset 104, the second processor 124 notifies the geo-fence module 120, e.g., gives the geo-fence module 120 the current position of the UE 100, that at least one of the second geo-fence rules 107 has been broken. Thereafter, the geo-fence module 120 determines if the at least one second rule that was broken is indicative of any of the first geo-fence rules 105 being broken.

Figure 7:
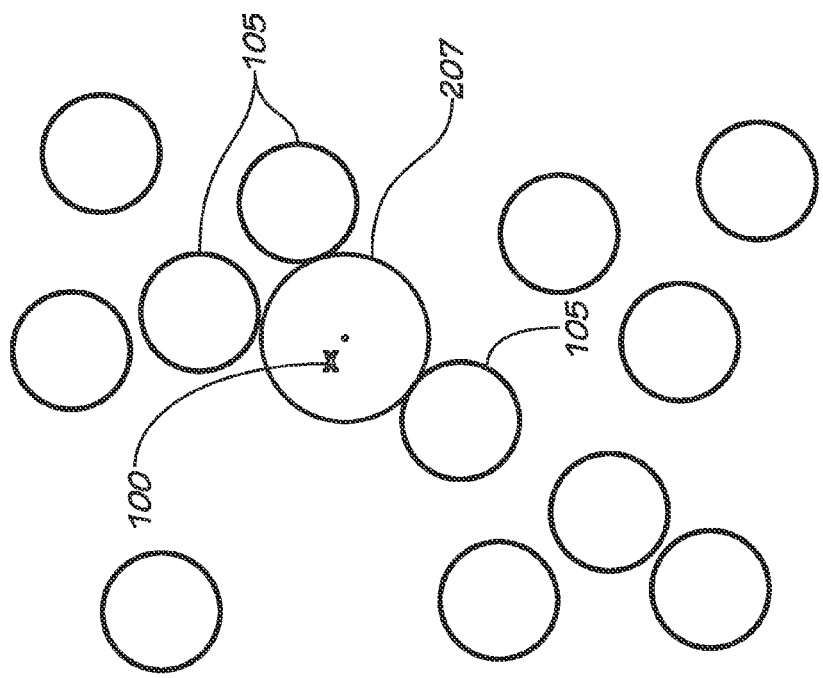

Referring to FIG. 7, if the second geo-fence rule that was broken is not indicative of breaking at least one of the first sets of geo-fence rules 105 (i.e., the geo-fence module 120 determines that the UE 100 is not within a real geo-fence area or is far enough away from any real geo-fence areas), the geo-fence module 120 generates another second set of geo-fence rules 207 based on where the UE 100 is located, and the geo-fence module 120 again powers down, e.g., goes back to sleep. Again, the second set of geo-fence rules 207 do not represent a particular geo-fence area, but rather an area of interest that when crossed by the UE 100, alerts the second processor 124 to notify the geo-fence module 120 of the first chipset 102 to determine whether at least one of the first set of geo-fence rules has been broken.

Figure 8:
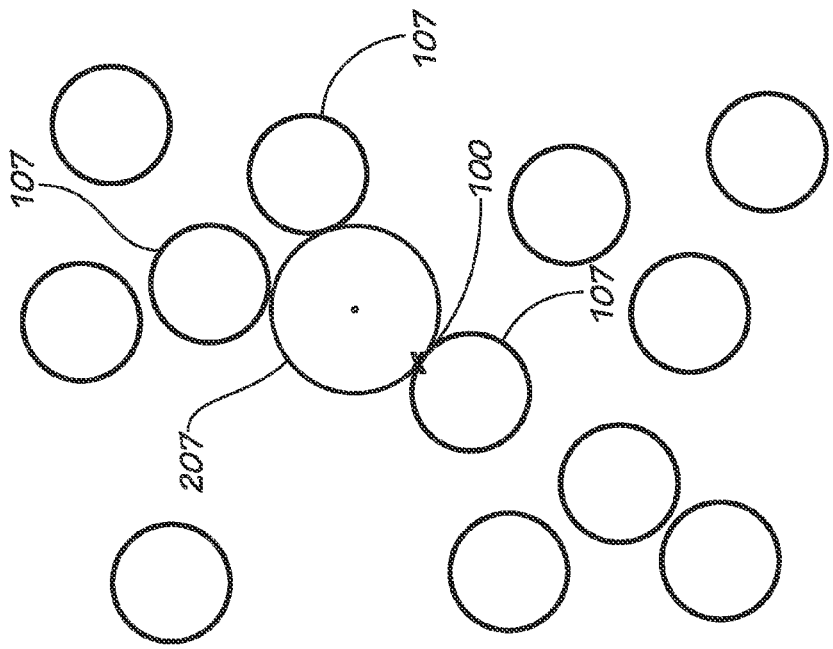

Referring to FIG. 8, if the UE 100 moves outside of the another second set of geo-fence rules 207, i.e., outside the area of interest, that was transmitted to the second processor 124 of the second chipset 104, the second processor 124 notifies the geo-fence module 120, e.g., gives the geo-fence module 120 the current position, that at least one of the another second geo-fence rules 207 has been broken. Thereafter, the geo-fence module 120 determines if the at least one of the another second rules 207 that was broken is indicative of any of the first geo-fence rules 105 being broken.

Figure 9:
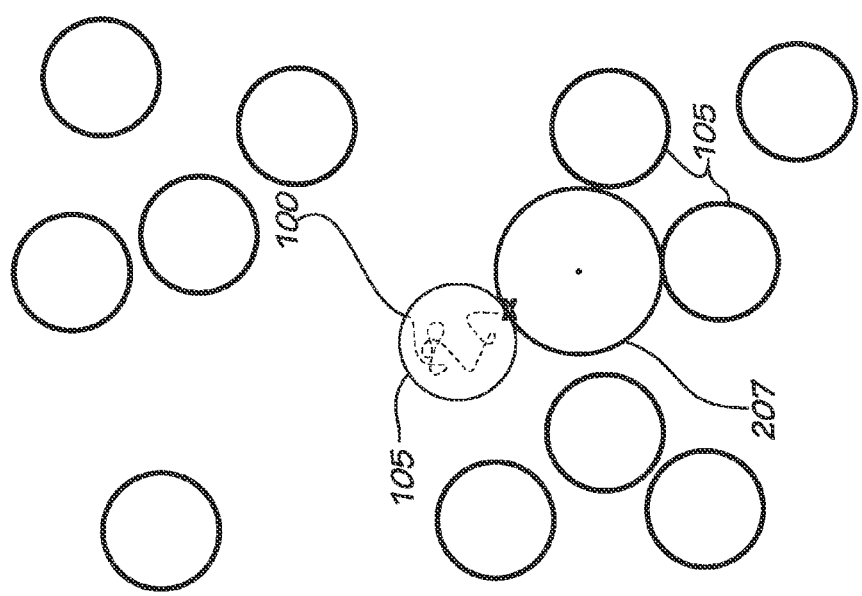

Referring to FIG. 9, if the geo-fence module 120 determines that the at least of the another second set of geo-fence rules 207 is broken and is indicative of breaking at least one of the first set of geo-fence rules 105 (i.e., the UE 100 moved within a real geo-fence area), the geofence module 120, in embodiments, notifies the second processor 124 to switch the second chipset 104 to a continuous update mode. In continuous update mode, the second processor 124 of the second chipset 104, in normal power saving mode, performs continuous 1 Hz updates (assuming that this is requested by the first geo-fence rule). It is noted that while the second processor 124 performs the continuous 1 Hz updates, the second processor 124 does not process information relating to the real geo-fence area; hence the reason why the second chipset 104 is capable of functioning in normal power savings mode, as the second processor 124 is not loaded down with heavy calculations associated with monitoring the real geo-fence area.

In embodiments according to the present invention, the geofence module 120 may send a different notification to the second chipset 104, as the contents of notification may change according to which one of the first set of geo-fence rules 105 was broken.

With continued reference to FIG. 9, the geo-fence module 120 and/or the first processor 118 of the first chipset 102 monitors the real geo-fence area as the UE 100 moves (shown by the dashed lines within the real geo-fence area corresponding to the first set of geo-fence rules 105 in FIG. 9) within the real geo-fence area to determine, amongst other things, if the UE 100 moves outside of the real geo-fence area. Since the first chipset 102 is required to be active within the real geo-fence area, there is no need, while the UE 100 is within the real geo-fence area, to generate and transmit another second set geo-fence rules to the second chipset 104, as such an operation would require the second chipset 104 to use more power, i.e., the second chipset 104 would be required to monitor the another second set of geo-fence rules, i.e., an area of interest.

Upon the UE 100 moving outside of the real geo-fence area, the geo-fence module 120 generates another second set of geo-fence rules (not shown) and transmits the another second set of rules to the second processor 124 of the second chipset 104, so that the aforementioned process may be repeated.

Figure 10:
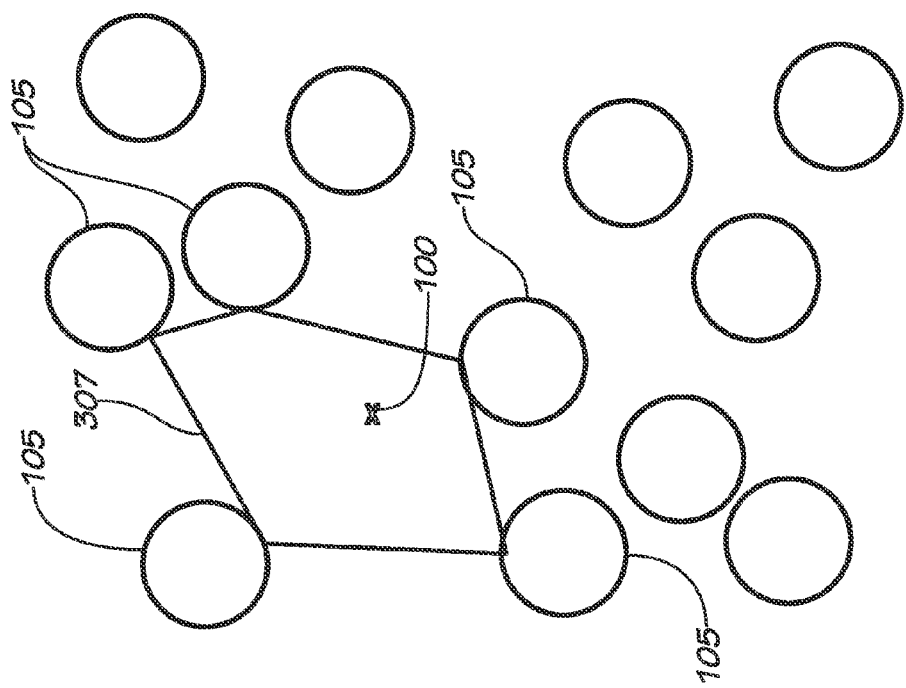
FIG. 10 is a diagram illustrating the UE within a geo-fence region that is based on a simplified set of geo-fence rules, according to another embodiment of the present invention.

FIG. 10 is a diagram illustrating the UE 100 within a geo-fence region that is based on a simplified set of geo-fence rules, according to another embodiment of the present invention. As shown in FIG. 10, the second set of geo-fence rules 307, i.e., an area of interest, may include a convex hull configuration. Such a configuration is easy to manage and could be used instead of a circle configuration as described above. While such a configuration may increase the setup cost for the first chipset 102, this configuration provides longer power down times for the first chipset 102. When implementing the convex hull configuration, a parameter that may be used to achieve maximum power efficiency from the second set of geo-fence rules 307 may include, for example, the closest distance required for the UE 100 to move outside the area of interest; this allows for further power savings at the second chipset 104. Another parameter that may be used to achieve maximum power efficiency from the second set of geo-fence rules 307 may include, for example, intersecting a line within at a border of the area of interest; this parameter implements rule testing, as described above.

Figure 11:
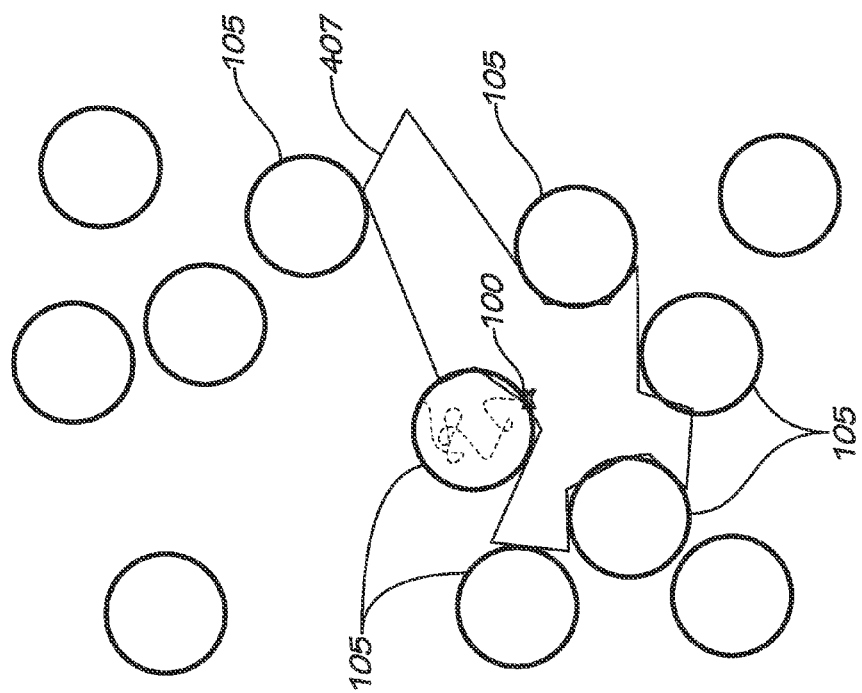
FIG. 11 is a diagram illustrating the UE within a geo-fence region that is based on a simplified set of geo-fence rules, according to another embodiment of the present invention.

FIG. 11 is a diagram illustrating the UE 100 within a geo-fence region that is based on a simplified set of geo-fence rules, according to another embodiment of the present invention. As shown in FIG. 11, the second set of geo-fence rules 407, i.e., an area of interest, may include a single fitted polygon configuration. While such a configuration may provide even more power efficiency over the convex hull configuration for both the first chipset 102 and second chipset 104, this configuration is more complex for the first chipset 102 and second chipset 104 to function under and is more expensive to implement.

Figure 12:
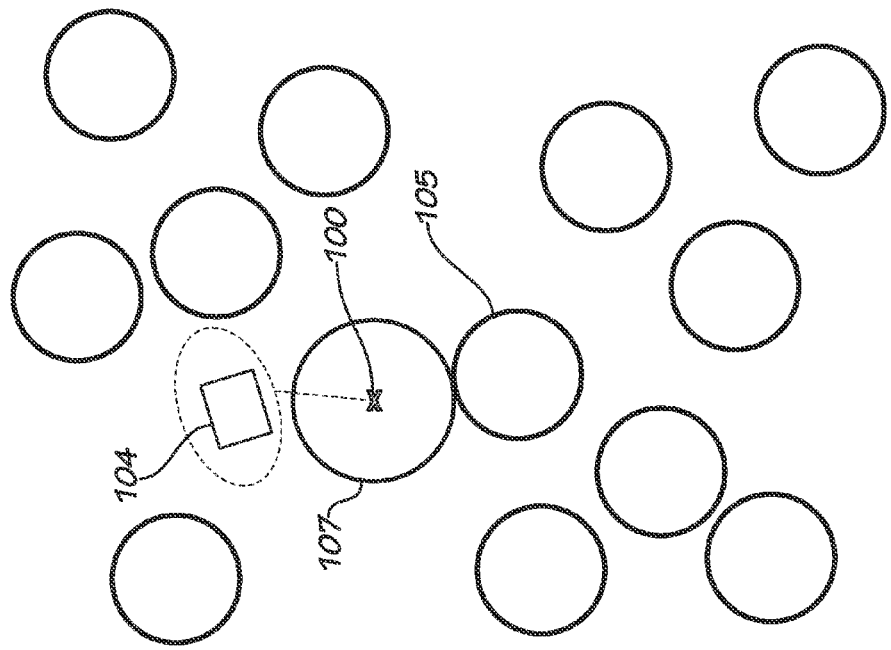
FIG. 12 is a diagram illustrating the UE within a geo-fence region that is based on a simplified set of geo-fence rules, according to another embodiment of the present invention.

FIG. 12 is a diagram illustrating the UE 100 within a geo-fence region that is based on a simplified set of geo-fence rules, according to another embodiment of the present invention. In the embodiment illustrated in FIG. 12, the second chipset 104 is embodied as a tracker (e.g., the second chipset 104 includes navigation or micro-navigational (micro-nav) capability). In such an embodiment, the geo-fence module 120 of the first chipset 102 is programmed to determine the biggest circle centered on an original position of the UE 100, i.e., for determining a first geo-fence area. Once the geo-fence module 120 determines the first geo-fence area, the first geo-fence area is transmitted to the navigation ranging module 126 of the second chipset 104, which can function in a low power mode, e.g., a micropowermanagement (MPM)-like mode. Upon receiving the first geo-fence area, the navigation ranging module 126 can calculate the distance from its original position. Once the UE 100 moves outside the first geo-fence area, the navigation ranging module 126 notifies the geo-fence module 122 of the first chipset 102, and the operations described above relating to determining if the first set of geo-fence rules 105 have been broken are then performed, and the process may be repeated. While embodying the second chipset 104 in the form of a tracker also provides the UE 100 with the aforementioned geo-fence problem solving efficiency, such a configuration is limited to only circular geo-fences that are centered on an original position of the UE 100. As can be appreciated, the second processor 124 of the second chipset 104 can be programmed to perform the functions of the navigation ranging module 126 and vice versa.

Figure 13:
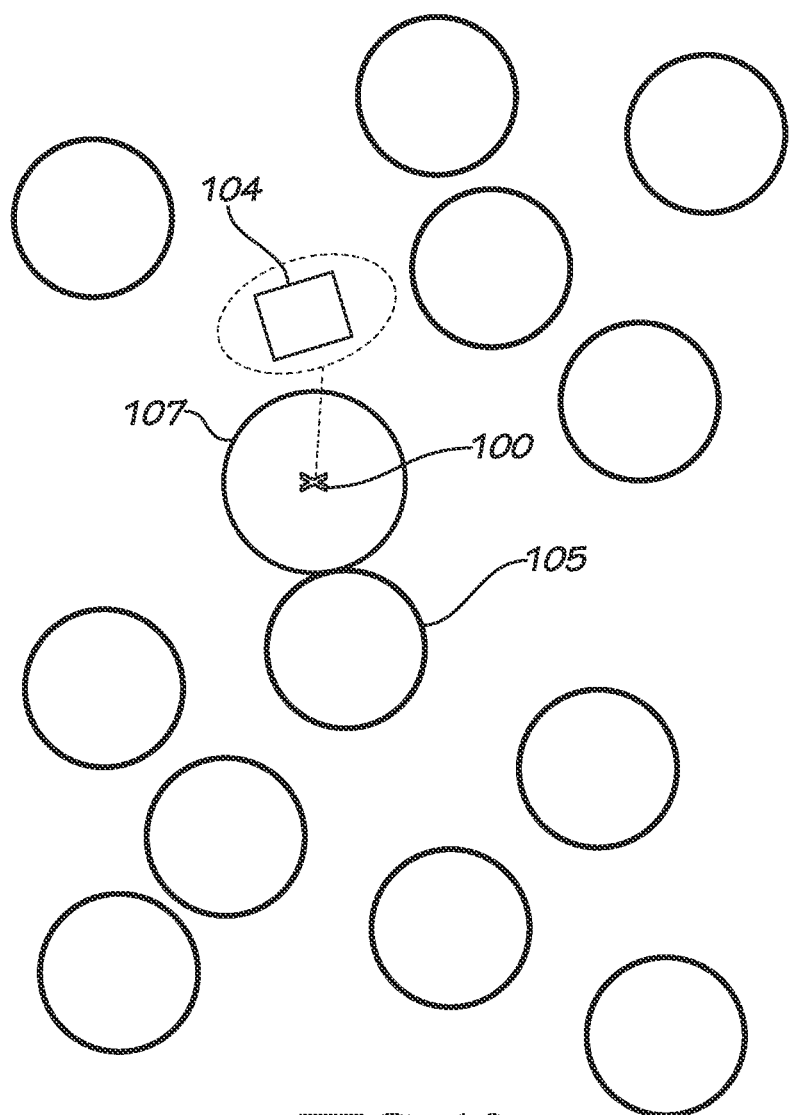
FIG. 13 is a diagram illustrating the UE within a geo-fence region that is based on a simplified set of geo-fence rules, according to another embodiment of the present invention.

FIG. 13 is a diagram illustrating the UE 100 within a geo-fence region that is based on a simplified set of geo-fence rules, according to another embodiment of the present invention. In the embodiment illustrated in FIG. 13, the geo-fence module 102 of the first chipset 102 is programmed to determine the circle around the position UE 100 as described above, i.e., for determining a first geo-fence area. Additionally, the geo-fence module 120 uses assumptions regarding dynamics of the UE 100 to determine a time duration for which it would take the UE 100 to move outside the first geo-fence area, i.e., a time duration prior to a geo-fence rule being broken. Once the geo-fence module 120 determines the time duration, the time duration is transmitted to the second processor 124 of the second chipset 104 for configuring the clock 122 of the second chipset 104 to notify the second processor 124 upon expiry of the time duration. Once the processor 128 notifies the geo-fence module 122 of the first chipset 102 of the expiry of the time duration, the operations described above relating to determining if the first set of geo-fence rules 105 have been broken are then performed, and the process may be repeated.

In accordance with the present invention, the apparatuses and method described herein overcome the drawbacks described above associated with conventional UEs. More specifically, as the second chipset 104 is only programmed to determine when at least one of second set of geo-fence rules 107 is broken, the second chipset 104 does not require the computational resources or memory to resolve the full set of geo-fence rules, e.g., the first set of geo-fence rules 105, which results in less power consumption of the UE 100. Additionally, as the first chipset 102 can be completely powered off until the at least one rule of the second set of geo-fence rules 107 is broken, which, in practice, can be many hours, potentially even days, results in even less power consumption of the UE 100 when compared to conventional UEs.

While the apparatuses and methods have been described herein using first and second chipsets, more than two chipsets can be used. For example, third, fourth, fifth, etc. chipsets can be used such that the second set of geo-fence rules 107 can be simplified even further, thus making the geo-fence solving operation even more efficient. In such embodiments, these chipsets, for example, may detect relative ranging source differences from radio sources and may be provided with a simplified rule set to monitor the ranging differences. The additional chipsets may also notify upwards, e.g., from a fifth chipset to a first chipset, if the simplified rule set is broken. Other than the number of chipsets being implemented, the basic concept described hereinabove remains the same.

In embodiments according to the present invention, the second processor 124 of the second chipset 104 can also be programmed to determine if, after receiving the second set of geo-fence rules 107 from the geo-fence module 120, the second set of geo-fence rules 107 should be redefined to include a long-term power down duration of the first chipset 102, such as when the UE 100 is a predetermined distance away from breaking the first set of geo-fence rules 105. If it is determined that the second set of geo-fence rules 107 should be redefined, the second processor 124 (and/or the navigation ranging module 126) of the second chipset 104 notifies the geo-fence module 120 to power down the first chipset 102 for the long-term power down duration. In such an embodiment, the clock 122 of the second chipset 104 is powered up for the long-term power down duration and is configured to alert the second processor 124 upon expiry of the long-term power down duration.

In embodiments, the second processor 124 of the second chip set 104 may be programmed to generate power efficient rule sets for MEMS and WiFi engines when such rule sets are deemed more power efficient.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method performed by a user equipment (UE), the method comprising:
    generating, with a first chipset, a first set of geo-fence rules and a second set of geo-fence rules, which are a simplified subset of the first set of geo-fence rules;
    transmitting the second set of geo-fence rules to a second chipset;
    powering down the first chipset;
    detecting if at least one of the second set of geo-fence rules has been broken; and
    if at least one least one of the second set of geo-fence rules is broken, powering up the first chipset to determine if the at least one broken second rule is indicative of breaking at least one rule of the first set of geo-fence rules.

2. The method according to claim 1, further comprising, if at least one of the second set of geo-fence rules is broken and not indicative of breaking at least one of the first set of geo-fence rules, generating, with the first chipset, another second set of geo-fence rules which are a simplified subset of the first set of geo-fence rules, and transmitting the another second set of geo-fence rules to the second chipset.

3. The method according to claim 1, further comprising, if at least one of the second set of geo-fence rules is broken and indicative of breaking at least one of the first set of geo-fence rules, switching the second chipset to a continuous update mode, and monitoring, with the first chipset, a geo-fence area to the determine if the UE moves outside of the geo-fence area, and upon the UE moving outside of the geo-fence area, generating another second set of geo-fence rules.

4. The method according to claim 1, wherein the first chipset includes at least one first processor for controlling peripherals of the UE and at least one geo-fence module for generating the first set of geo-fence rules and the second set of geo-fence rules and controlling drivers of the UE, and the second chipset includes at least one low power clock and at least one second processor including at least one navigation ranging module, the at least one second processor programmed to detect if at least one of the second set of geo-fence rules has been broken.

5. The method according to claim 4, wherein powering down the first chipset comprises powering down the at least one geo-fence module.

6. The method according to claim 4, wherein powering down the first chipset comprises powering down the at least one geo-fence module and the at least one first processor of the first chipset.

7. The method according to claim 6, wherein powering down the first chipset further comprises powering down at least one clock of the second chipset, other than the at least one low power clock.

8. The method according to claim 4, further comprising:
    determining, by the second chipset, if the second set of geo-fence rules should be redefined to include a long-term power down duration of the first chipset if the UE is a predetermined distance away from breaking the first set of geo-fence rules;
    powering down the first chipset for the long-term power down duration; and
    powering up the at least one low power clock of the second chipset for the long-term power down duration.

9. The method according to claim 1, wherein the second set of geo-fence rules is based on one of a convex hull configuration, a circle configuration, and a polygon configuration.

10. A user equipment (UE) comprising:
    at least two chipsets; and
    memory coupled to the at least two chipsets and configured to store instructions, which, when executed by the at least two chipsets, causes the at least two chipsets to perform operations comprising:
        generating, with a first chipset, a first set of geo-fence rules and a second set of geo-fence rules, which are a simplified subset of the first set of geo-fence rules;
        transmitting the second set of geo-fence rules to a second chipset;
        powering down the first chipset;
        detecting if at least one of the second set of geo-fence rules has been broken; and
        if at least one of the second set of geo-fence rules is broken, powering up the first chipset to determine if the at least one broken second rule is indicative of breaking at least one rule of the first set of geo-fence rules.

11. The UE according to claim 10, wherein the at least two chipsets are programmed to perform operations further comprising, if at least one of the second set of geo-fence rules is broken and not indicative of breaking at least one of the first set of geo-fence rules, generating, with the first chipset, another second set of geo-fence rules which are a simplified subset of the first set of geo-fence rules, and transmitting the another second set of geo-fence rules to the second chipset.

12. The UE according to claim 10, wherein the at least two chipsets are programmed to perform operations further comprising, if at least one of the second set of geo-fence rules is broken and indicative of breaking at least one of the first set of geo-fence rules, switching the second chipset to a continuous update mode and monitoring, with the first chipset, a geo-fence area to the determine if the UE moves outside of the geo-fence area, and upon the UE moves outside of the geo-fence area, generating another second set of geo-fence rules.

13. The UE according to claim 10, wherein the first chipset includes at least one first processor for controlling peripherals of the UE and at least one geo-fence module for generating the first set of geo-fence rules and the second set of geo-fence rules and controlling drivers of the UE, and the second chipset includes at least one low power clock and at least one second processor including at least one navigation ranging module, the at least one second processor programmed to detect if at least one of the second set of geo-fence rules has been broken.

14. The UE according to claim 13, wherein powering down the first chipset comprises powering down the at least one geo-fence module.

15. The UE according to claim 13, wherein powering down the first chipset comprises powering down the at least one geo-fence module and the at least one first processor of the first chipset.

16. The UE according to claim 15, wherein powering down the first chipset further comprises powering down at least one clock of the second chipset, other than the at least one low power clock.

17. The UE according to claim 13, wherein the at least two chipsets are programmed to perform operations further comprising:
    determining, by the second chipset, if the second set of geo-fence rules should be redefined to include a long-term power down duration of the first chipset if the UE is a predetermined distance away from breaking the first set of geo-fence rules;
    powering down the first chipset for the long-term power down duration; and
    powering up the at least one low power clock of the second chipset for the long-term power down duration.

18. The UE according to claim 10, wherein the second set of geo-fence rules is based on one of a convex hull configuration, a circle configuration, and a polygon configuration.

19. A user equipment (UE) comprising:
    at least two chipsets; and
    memory coupled to the at least two chipsets and configured to store instructions, which, when executed by the at least two chipsets, causes the at least two chipsets to perform operations comprising:
    generating, with a first chipset, a first geo-fence area of the UE;
    powering down the first chipset;
    determining, by a second chipset programmed with navigational capabilities, if the UE moves outside of the first geo-fence area;
    if the UE moves outside of the first geo-fence area, powering up the first chipset to determine if the UE has moved within another geo-fence area;
    if it is determined that the UE has not moved within another geo-fence area, generating, with the first chipset, a second geo-fence area and transmitting the second geo-fence area to the second chipset; and
    if it is determined that the UE has moved within another geo-fence area, switching the second chipset to a continuous update mode, and monitoring, with the first chipset, the another geo-fence area to the determine if the UE moves outside of the another geo-fence area, and upon the UE moving outside of the another geo-fence area, generating the second geo-fence area and transmitting the second geo-fence area to the second chipset.

20. A user equipment (UE) comprising:
    at least two chipsets; and
    memory coupled to the at least two chipsets and configured to store instructions, which, when executed by the at least two chipsets, causes the at least two chipsets to perform operations comprising:
    generating, with a first chipset, a first geo-fence area of the UE and a time duration for which it would take the UE to move outside the first geo-fence area;
    powering down the first chipset for the time duration;
    transmitting the time duration to a second chipset;
    if, upon expiration of the time duration, it is determined that the UE has not moved within another geo-fence area, generating, with the first chipset, a second geo-fence area and a second time duration for which it would take the UE to move outside the second geo-fence area, and transmitting the second time duration to the second chipset; and
    if, upon expiration of the time duration, it is determined that the UE has moved within another geo-fence area, switching the second chipset to a continuous update mode, and monitoring, with the first chipset, the another geo-fence area to the determine if the UE moves outside of the another geo-fence area, and upon the UE moving outside of the another geo-fence area, generating the second geo-fence area and the second time duration, and transmitting the second time duration to the second chipset.

* * * * *